(12) United States Patent
Lohr

(10) Patent No.: US 8,567,365 B2
(45) Date of Patent: *Oct. 29, 2013

(54) VACUUM PORT HAVING A FLOW DISRUPTOR

(75) Inventor: John Carl Lohr, Beverly Hills, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 475 days.

This patent is subject to a terminal disclaimer.

(21) Appl. No.: 12/823,926

(22) Filed: Jun. 25, 2010

(65) Prior Publication Data

US 2011/0315125 A1     Dec. 29, 2011

(51) Int. Cl.
*F02M 35/10*     (2006.01)

(52) U.S. Cl.
USPC .................... 123/184.21; 123/184.42

(58) Field of Classification Search
USPC ............... 123/184.21, 207, 184.53
See application file for complete search history.

(56) References Cited

U.S. PATENT DOCUMENTS

| | | | | |
|---|---|---|---|---|
| 4,112,898 A * | 9/1978 | Takimoto et al. | ............ | 123/521 |
| 4,130,102 A * | 12/1978 | Churchill | ................. | 123/198 F |
| 4,308,837 A * | 1/1982 | Nohira et al. | ................. | 123/442 |
| 4,484,541 A * | 11/1984 | Yokoyama | .................. | 123/41.1 |
| 5,715,782 A * | 2/1998 | Elder | ....................... | 123/184.61 |
| 5,931,140 A * | 8/1999 | Maloney | ....................... | 123/480 |
| 5,947,082 A | 9/1999 | Choi et al. | | |
| 6,196,187 B1 | 3/2001 | Zubeck et al. | | |
| 6,619,276 B1 | 9/2003 | Miller et al. | | |
| 7,086,384 B2 * | 8/2006 | Lee et al. | ...................... | 123/468 |
| 7,434,558 B2 | 10/2008 | Shinada et al. | | |
| 2002/0162532 A1 | 11/2002 | Shaw et al. | | |
| 2004/0226772 A1 | 11/2004 | Hirose et al. | | |
| 2007/0261684 A1 | 11/2007 | Hazelton et al. | | |
| 2008/0141968 A1 * | 6/2008 | Zhang et al. | ............. | 123/184.46 |

* cited by examiner

*Primary Examiner* — Lindsay Low
*Assistant Examiner* — Syed O Hasan
(74) *Attorney, Agent, or Firm* — Julia Voutyras; Alleman Hall McCoy Russell & Tuttle LLP

(57) ABSTRACT

An intake system is provided. The intake system including an intake manifold coupled to an engine and a vacuum port located in said intake manifold and in an air flow path downstream of a throttle body, the vacuum port including a molded flow disruptor including a cross-beam traversing an outlet of the vacuum port. The intake system may further include a vacuum passage coupling the vacuum port to a vehicle subsystem.

16 Claims, 7 Drawing Sheets

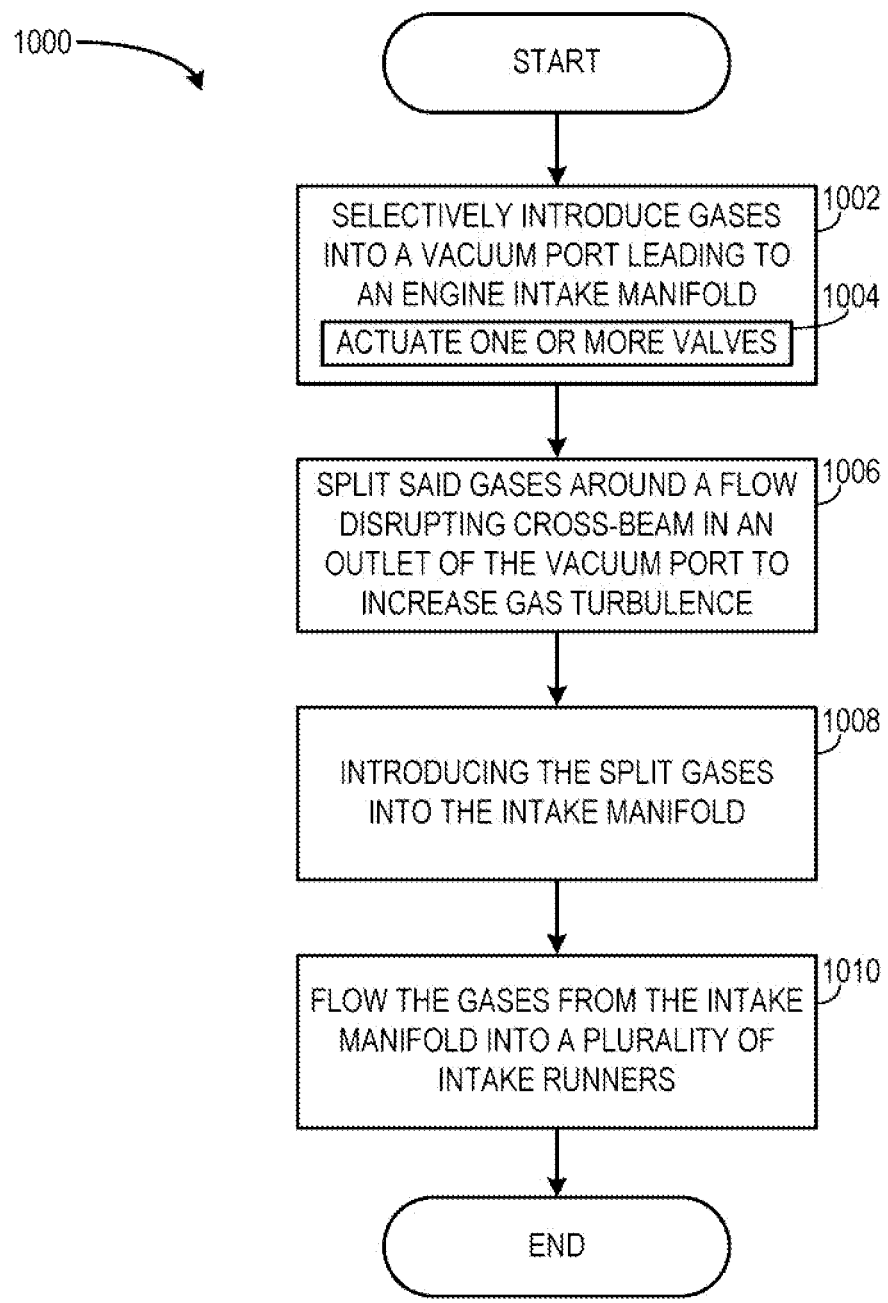

VACUUM PORT HAVING A FLOW DISRUPTOR

BACKGROUND/SUMMARY

Intake manifolds in internal combustion engines may include various ports for introducing gases into the intake manifold. In some examples, the ports may be coupled to systems which utilize the vacuum generated within the intake manifold to supplement various operations. For example, the intake manifold may be in fluidic communication with a positive crankcase ventilation system, a brake system, an evaporative emission system (e.g., vapor canisters), etc. However, objectionable noises, such as whistling, may be generated within the ports and the intake manifold during engine operation due to the flow characteristics within the aforementioned components. Furthermore, in some systems gases introduced into the intake manifold from the ports may not fully mix with the air in the intake manifold, increasing combustion variability and decreasing engine efficiency.

Some intake systems have used ramps positioned upstream of the ports in the intake manifold to reduce unwanted noise, as well as to promote mixing. However, the inventors herein have recognized various shortcomings with such an above approach. For example, ramps may increase losses within the intake manifold, thereby decreasing pressure within the intake manifold. Decreased intake manifold pressure may in turn degrade engine operation during certain operating conditions, such as when the throttle is fully open. Furthermore, it may be unfeasible to incorporate a ramp into an intake manifold using certain construction techniques, such as shell molding. Therefore, to incorporate ramps into an intake manifold, retrofitting of the intake manifold may be required or alternatively more complex and expensive construction techniques may be needed, increasing production costs.

As such, various example systems and approaches are described herein. In one example an intake system is provided. The intake system may include an intake manifold coupled to an engine and a vacuum port located in said intake manifold and in an air flow path downstream of a throttle body and upstream of a plurality of intake runners. The vacuum port may include a molded flow disruptor including a cross-beam traversing an outlet of the vacuum port. The intake system may further include a vacuum passage coupling the vacuum port to a vehicle subsystem.

In this way, it is possible to reduce unwanted noises while promoting mixing of the gases from the port with the intake air. In particular the cross-beam splits the flows of the gases through the vacuum port generating a turbulent wake downstream of the cross-beam in the intake manifold, thereby promoting mixing of the gas from the vacuum port with gas from the throttle body. Furthermore, in some embodiments the intake manifold and flow disruptor may be integrally molded using shell molding. In this way, the intake manifold and vacuum port may be manufactured utilizing a low cost technique.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE FIGURES

FIG. 10 shows a method for operation of an intake system in an internal combustion engine.

DETAILED DESCRIPTION

An intake manifold having a vacuum port including a flow disruptor is disclosed herein. The vacuum port may be positioned downstream of a throttle body and upstream of a plurality of intake runners. The flow disruptor may increase turbulence within the intake manifold. In turn the turbulence may promote mixing of the gases from the vacuum port with gases from a throttle body positioned upstream of the intake manifold. Additionally, the turbulence generated via the flow disruptor may decrease flow-generated noises within the intake manifold. In this way, both customer satisfaction and combustion efficiency may be increased.

Figure 1:
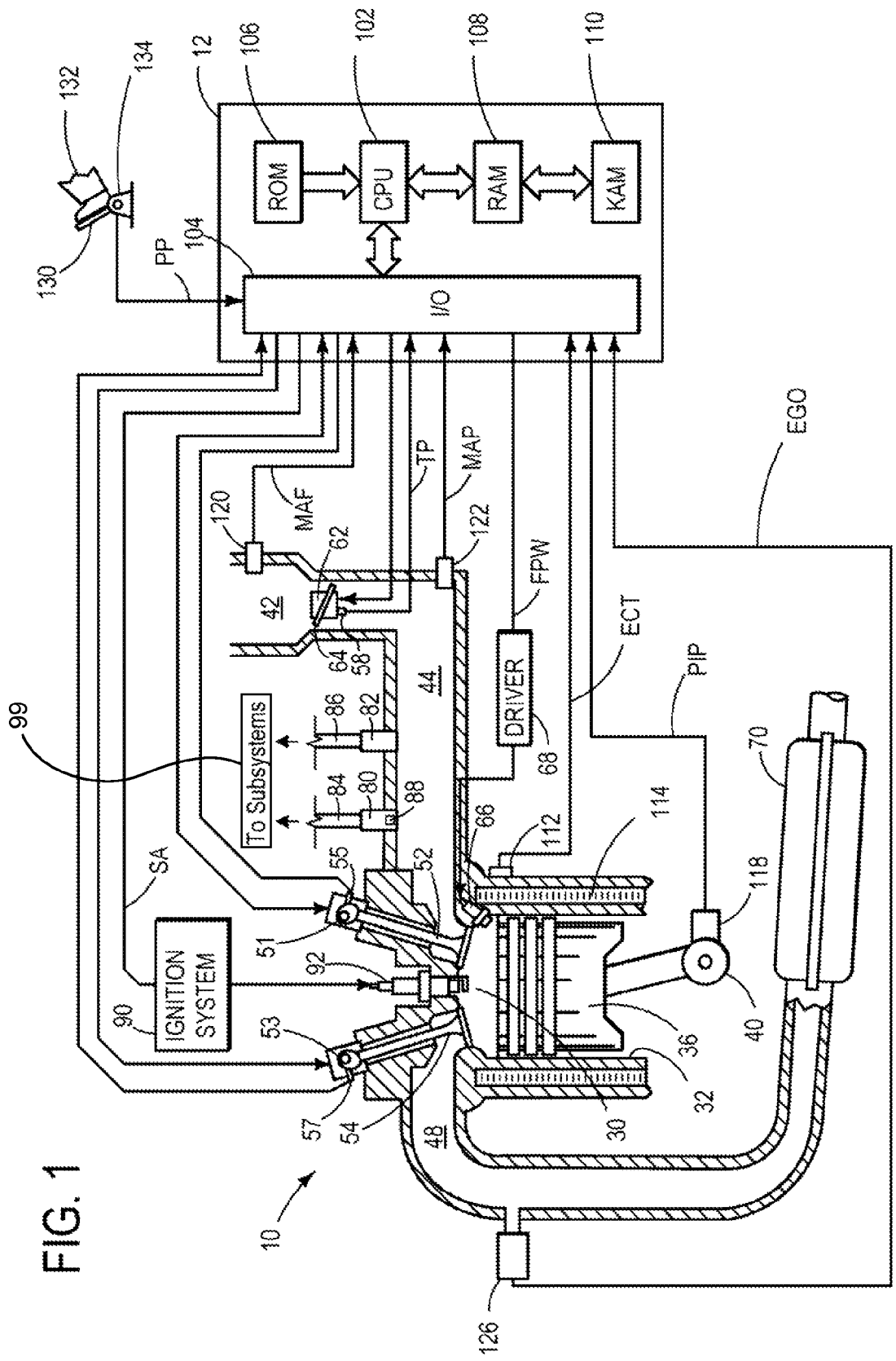
FIG. 1 shows a schematic depiction of an internal combustion engine.
Figure 2:
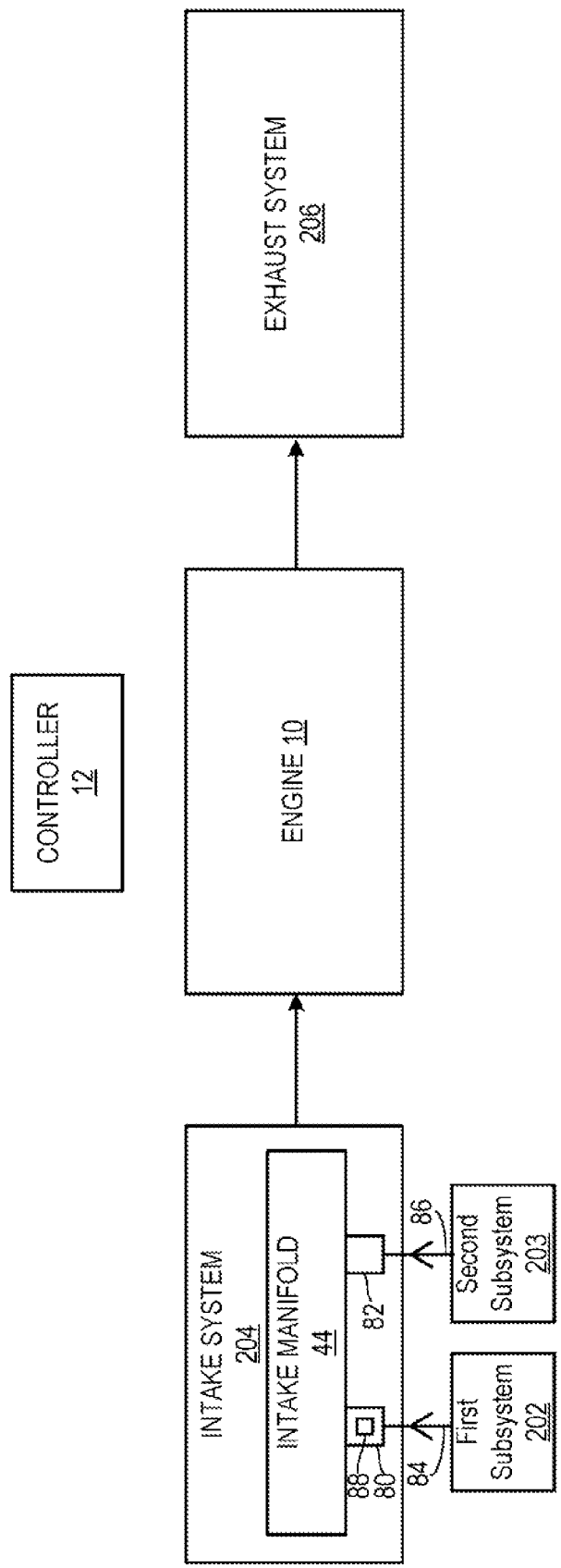
FIG. 2 shows a schematic depiction of a vehicle including the internal combustion engine shown in FIG. 1.
Figure 3:
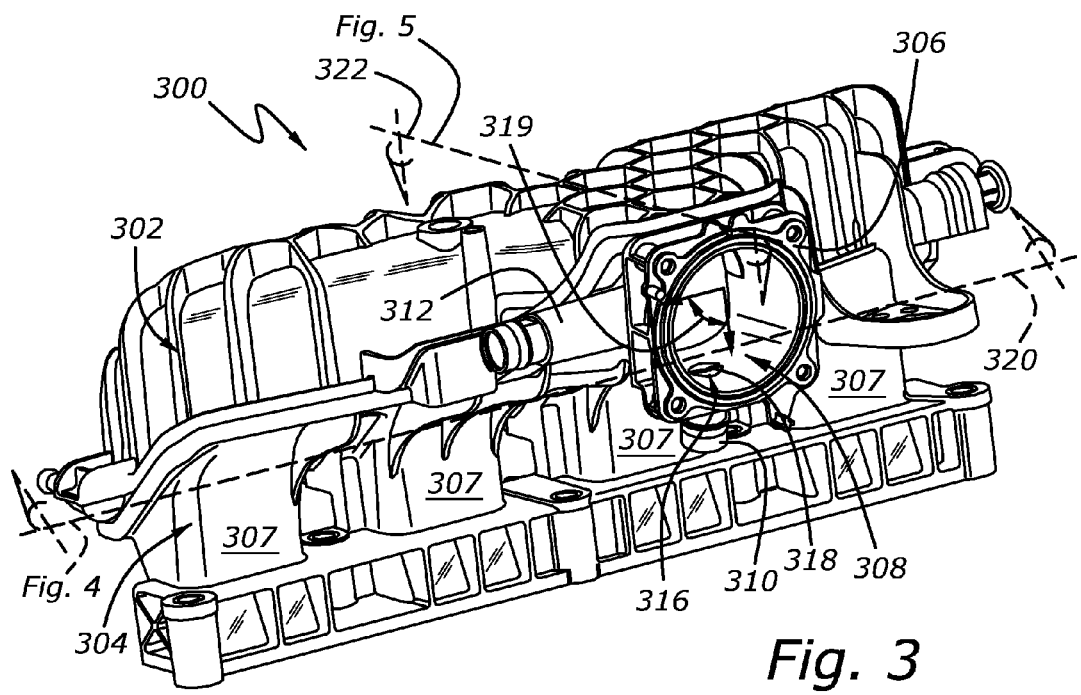
FIG. 3 shows a perspective view of an example intake manifold drawn approximately to scale.
Figure 4:
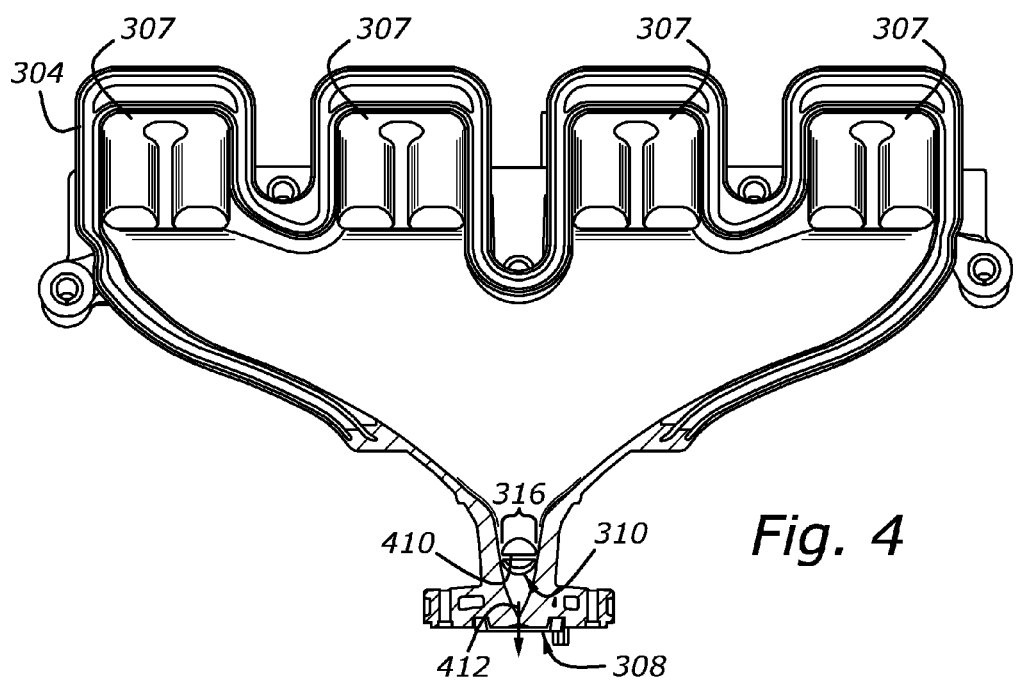
FIG. 4 shows a cross-sectional view of a lower shell of the intake manifold shown in FIG. 3 drawn approximately to scale.
Figure 5:
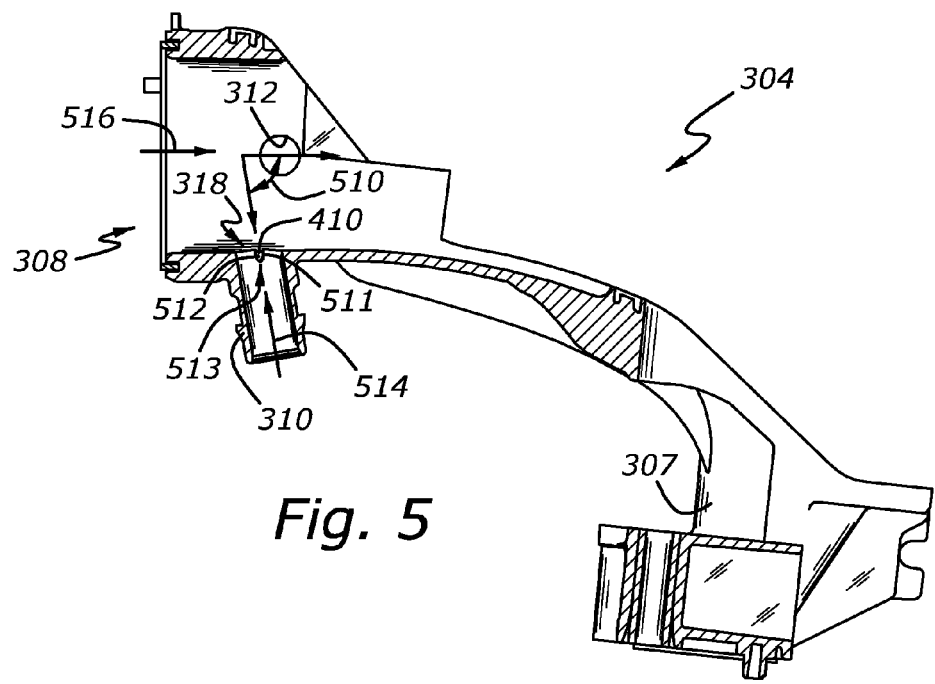
FIG. 5 shows another cross-sectional view of the lower shell of the intake manifold shown in FIG. 3 drawn approximately to scale.
Figure 6:
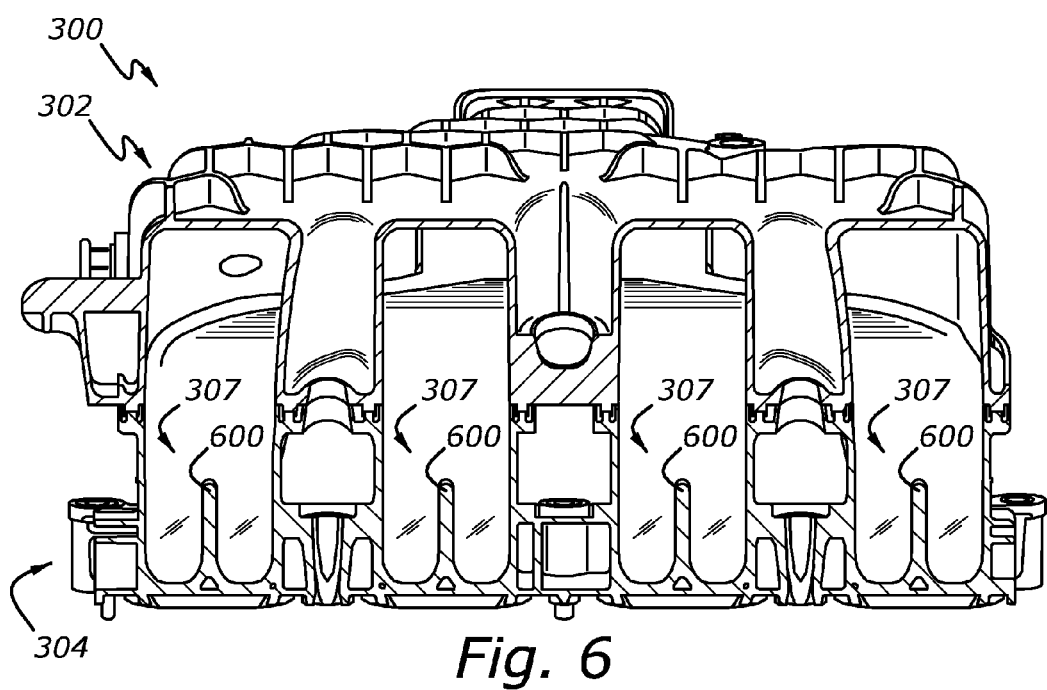
FIG. 6 shows a cross-sectional view of the intake runners included in the intake manifold shown in FIG. 3 drawn approximately to scale.
Figure 7:
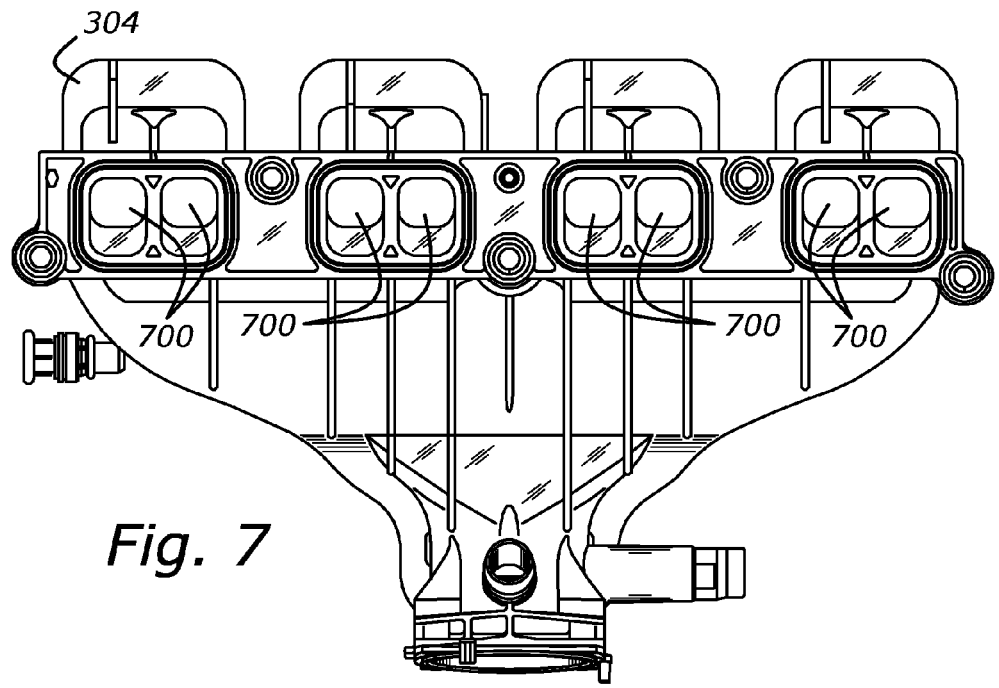
FIG. 7 shows a bottom view of the intake manifold shown in FIG. 3 drawn approximately to scale.
Figure 8:
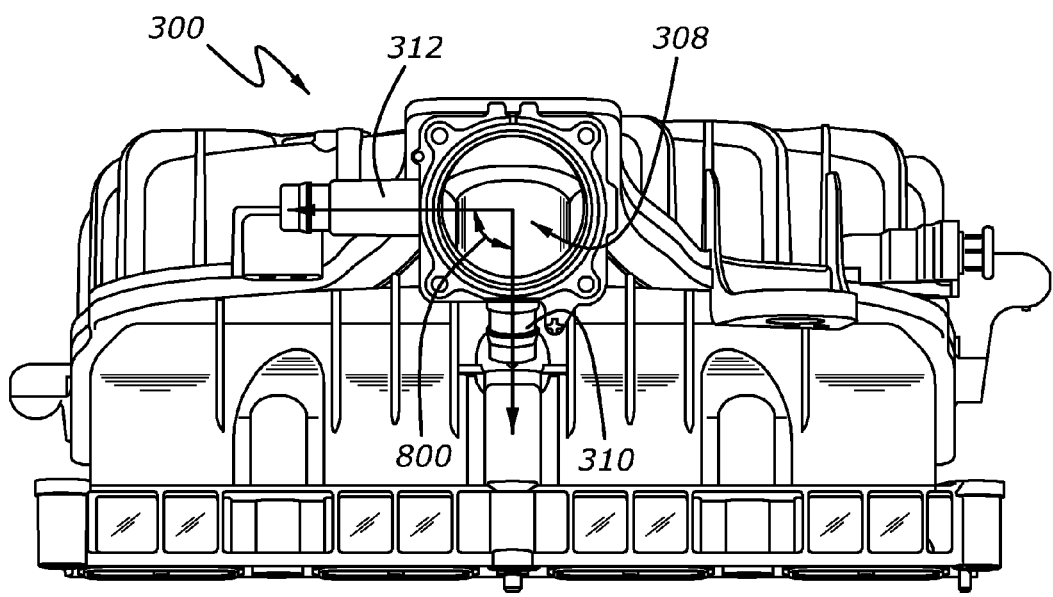
FIG. 8 shows a front view of the intake manifold shown in FIG. 3 drawn approximately to scale.
Figure 9:
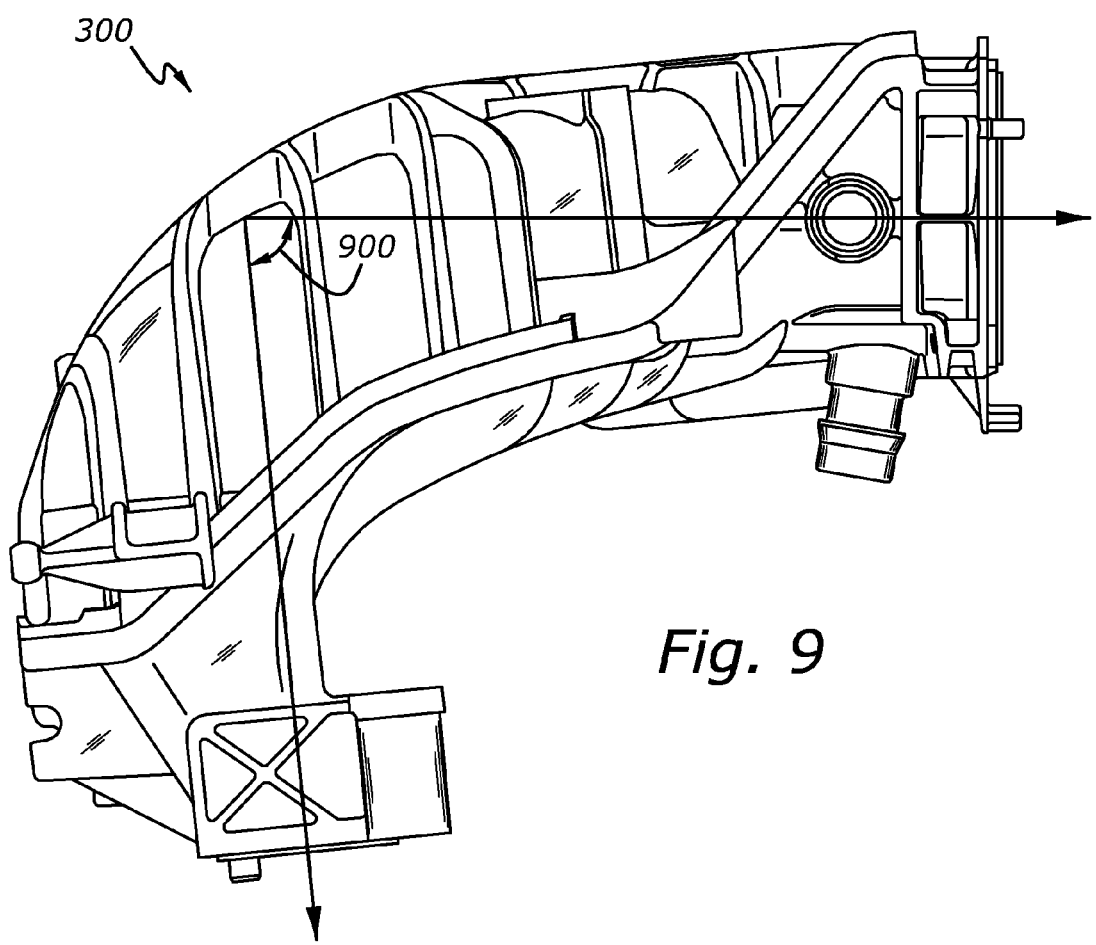
FIG. 9 shows a side view of the intake manifold shown in FIG. 3 drawn approximately to scale.

FIGS. 1 and 2 show schematic depictions of an engine and accompanying intake system. FIG. 3 shows a perspective view of an example intake manifold including a vacuum port having a flow disruptor. FIGS. 4 and 5 show various views of a lower shell of the intake manifold shown in FIG. 3. FIG. 6 shows a cross-sectional view of intake runners positioned downstream of the flow disruptor in the intake manifold shown in FIG. 3. FIGS. 7-9 show additional views of the intake manifold shown in FIG. 3 and FIG. 10 shows a method for operation of an intake system.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57.

Intake manifold 44 is also shown intermediate of intake valve 52 and air intake zip tube 42. Fuel is delivered to fuel injector 66 by a fuel system (not shown) including a fuel tank, fuel pump, and fuel rail. Engine 10 of FIG. 1 is configured such that the fuel is injected directly into the engine cylinder, which is known to those skilled in the art as direct injection. However, port injection may be used in other embodiments.

Fuel injector 66 is supplied operating current from driver 68 which responds to controller 12. In addition, intake manifold 44 is shown communicating with optional electronic throttle 62 with throttle plate 64. In one example, a low pressure direct injection system may be used, where fuel pressure can be raised to approximately 20-30 bar. Alternatively, a high pressure, dual stage, fuel system may be used to generate higher fuel pressures.

A first vacuum port 80 and a second vacuum port 82 are coupled to intake manifold 44. The first vacuum port is coupled to vacuum passage 84 and the second vacuum port is coupled to vacuum passage 86. Each vacuum passage may be coupled to one of the following vehicle subsystems 99: a brake system, a crankcase ventilation system, an evaporative emission system, and an exhaust gas recirculation (EGR) system. Therefore, the first vacuum port may be a brake boost port, a positive crankcase ventilation port, or a fuel vapor purge port. In this way gases from the aforementioned subsystems may be drawn into the intake manifold during certain engine operating conditions, such as when the intake manifold is below atmospheric pressure. As shown, the first vacuum port includes a flow disruptor 88, and the second vacuum port does not include a flow disruptor. Although the flow disruptor is generically represented as a box it will be appreciated that the flow disruptor may have a geometric configuration conducive to reducing flow-generated noise within the intake manifold. FIGS. 3-5 show detailed illustrations of an example flow disruptor, discussed in greater detail herein. Further in other embodiments additional vacuum ports may be coupled to the intake manifold. Furthermore, the second vacuum port and/or the additional vacuum ports may also include flow disruptors.

Distributorless ignition system 90 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a microcomputer including: microprocessor unit 102, input/output ports 104, read-only memory 106, random access memory 108, keep alive memory 110, and a data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. However, in other examples compression ignition may be used. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

A schematic depiction of a vehicle 200 including a first vehicle subsystem 202 and a second vehicle subsystem 203 is shown in FIG. 2. As illustrated an intake system 204 including intake manifold 44 is coupled to engine 10 which is coupled to exhaust system 206. The first subsystem is coupled to vacuum passage 84. Vacuum passage 84 is coupled to the intake manifold via vacuum port 80 including a flow disruptor 88. Additionally, the second subsystem is coupled to vacuum passage 86. Vacuum passage 86 is coupled to the intake manifold via vacuum port 82.

As previously discussed, the vehicle subsystems may be operated to enable gases to flow through the intake ports while a vacuum is present in the intake manifold. In this way, fluidic communication between the first vehicle subsystem and the intake manifold may be selectively enabled. It will be appreciated that a vacuum may be generated when combustion cycles are occurring in the engine and the throttle is at least partially obstructing airflow in the intake system. For example, the evaporative emission system may be purged while a vacuum is generated in the intake manifold. Purging the evaporative emission system may include enabling fluidic communication between a vapor canister and the intake manifold. Additionally, air may be circulated through the crankcase to the intake manifold when a vacuum is present in the intake manifold. Moreover, exhaust gas may be re-circulated via the EGR system when a vacuum is present in the intake manifold. The EGR system may include a loop coupling the intake system to the exhaust system. Additionally, the brake system may enable fluidic communication with the intake manifold when additional braking assistance has been requested and a vacuum is present in the intake manifold.

Now referring to FIG. 3 showing a perspective view of an example intake manifold 300 configured to supply air to an I-4 engine, which may be a turbocharged or naturally aspirated engine. It will be appreciated that the intake manifold shown in FIG. 3 is drawn approximately to scale. Intake manifold 300 may be intake manifold 44 shown in FIG. 1. The intake manifold may include an upper shell 302 and a lower shell 304. The upper and lower shells may be molded via a suitable molding process, such as shell molding. However, in other embodiments the upper and lower shells may be constructed via another suitable technique. Additionally, the upper and lower shells are held together by fasteners (not shown) and sealed with gaskets to reduce the possibility of drawing unmetered air into the engine.

Lower shell 304 includes a throttle body mounting flange 306 for coupling a throttle body (not shown) to intake manifold 300. The throttle body effective area may be increased and decreased to allow the engine air amount to meet operator demands by opening and closing a throttle valve. In this way, a vacuum may be generated within the intake manifold during certain operating conditions.

The intake manifold may further include a plurality of intake runners 307 positioned downstream of the throttle body mounting flange. Each intake runner may be coupled to at least one engine intake valve. Thus, the intake manifold may direct gases into the engine for combustion. The intake runners are discussed in greater detail herein with regard to FIGS. 6-7.

The intake manifold further includes a throat 308 having a first vacuum port 310 and a second vacuum port 312 coupled thereto. It will be appreciated that the first and second vacuum ports are positioned downstream of the throttle body (not shown) and upstream of intake runners 307. As previously discussed, each of the vacuum ports may be coupled to one of the following subsystems: a crankcase ventilation system, a brake system, an evaporative emission system, and an EGR system via a vacuum passage. In other embodiments additional or alternate ports may be included in throat 308.

Flow disruptor 316 is disposed within an outlet of the first vacuum port 310, but not in port 312. The flow disruptor may be integrally molded into the first vacuum port, in some examples. As depicted the flow disruptor includes a cross-beam 318 traversing an outlet of the first vacuum port. The geometric characteristics of the flow disruptor are discussed in greater detail herein with regard to FIGS. 4 and 5.

The first vacuum port 310 may be positioned at an angle 319 with respect to the second vacuum port 312. Angle 319 may be between 45°-135°, such as 90°. Additionally, the first vacuum port may be positioned at an angle 510, shown in FIG. 5, with respect to an axis of the throat of the intake manifold. Angle 510 may be between 45°-135°, such as 90°. Furthermore, the second vacuum port 312 may be positioned at an angle with respect to an axis of the throat. Specifically the second vacuum port may be positioned at an angle between 45°-135°, such as 90°, with respect to the axis of the throat of the intake manifold in some embodiments. It has been found that when the vacuum ports are positioned in this manner mixing within the intake manifold is promoted and flow-generated noises are reduced.

FIG. 4 shows a cross-sectional view of lower shell 304 of intake manifold 300. Cutting plane 320, shown in FIG. 3, defines the cross section shown in FIG. 4. Cross-beam 318 of the flow disruptor spans the outlet of the first vacuum port. In particular, cross-beam 318 may intersect the axis of the first vacuum port. However, it will be appreciated that in other embodiments the cross-beam may be offset from the axis of the first vacuum port. Additionally, outer-face 410 of the cross-beam is substantially planar. However, in other embodiments the outer-face may be curved. Further, in other embodiments, a plurality of cross-beams may traverse the outlet of the first vacuum port.

As shown, the cross-beam may be substantially perpendicular to axis 412 of throat 308. When the cross-beam is aligned in this way, a flow pattern within the intake manifold may be generated that reduces unwanted noises in the intake manifold. However other alignments may also be used, such as a range between 45°-135°. Furthermore, the ratio between the width of the outer-face of the cross-beam and the radius of the vacuum passage may be between 0.1 and 1. When the width to radius ratio is within the aforementioned range a flow pattern that reduces noises within the intake manifold without reducing the flow-rate of the gas through the vacuum port by a significant amount may be generated.

FIG. 5 shows another cross-sectional view of the lower shell 304 of intake manifold 300. Cutting plane 322, shown in FIG. 3, defines the cross section depicted in FIG. 5. Angle 510 defined by the intersection of the axis of the throat and the axis of the first vacuum port may be between 45° and 135°, and in one example is about 90°, When angles within these ranges are formed, the mixing of gases from the two sources may be increased. Specifically, it has been found that an angle of 90° for each of the angles is unexpectedly effective at reducing flow-generated noises within the intake manifold and promoting mixing of the gases. However, it will be appreciated that other angles may be used in other embodiments.

As shown a cross-section of cross-beam 318 may define a wedge having a flat surface (i.e., outer-face 410) and two curved surfaces, 511 and 512, forming an inner face 513. As shown the curved surfaces are correspondingly convex. However in other embodiments at least one of the curved surfaces may be concave. The curved surfaces may decrease the width of the turbulent wake behind the flow disruptor. It will be appreciated that the curvature of the surfaces may be tuned to generate a desired amount of wake capable of reducing or in some cases eliminating flow-generated noises in the intake manifold. However in other embodiments the cross-section of the cross-beam may be circular.

Additionally, the first and second vacuum ports, 310 and 312, are offset with respect to the general direction of intake flow into throat 308. In particular the second vacuum port may be positioned downstream of the first vacuum port. When the vacuum ports are positioned in this way, the flow disruptor in the first vacuum port generates an increased amount of turbulence downstream. Therefore, the flow disruptor may diminish the noise generated by gas-flow over downstream vacuum ports. Therefore it may be unnecessary to include flow disruptors in the second vacuum port. In other words, the second vacuum port 312 may have an unobstructed opening.

Arrow 514 denotes the general direction of gas flow into the intake manifold from the first vacuum port. Arrow 516 denotes the general direction of gas flow into the intake manifold from the throttle body. Therefore it will be appreciated that gases may flow into the intake manifold from a throttle body (not shown) through throat 308 and into intake runners 307.

FIG. 6 shows a cross-sectional view of the intake runners 307. Each intake runner may include a partition 600 spanning a channel defined by an intake runner. Each partition may be substantially aligned with the general direction of gas flow through the intake runners. In this way, the intake flow may be divided into multiple flows channels. Each of the intake runners may further include a runner outlet 700 shown in FIG. 7. Furthermore, each runner outlet may be fluidly coupled to at least one engine intake valve.

FIG. 8 shows a front view of intake manifold 300. As shown, angle 800 defines the spacing between the first and second vacuum ports with respect to the general direction of intake air-flow through throat 308. In the depicted embodiment angle 800 is approximately 90°. However in other embodiments, angle 800 may be between 45°-120°. It will be appreciated that when the vacuum ports are positioned in this way the interaction between the gases flowing out of the vacuum ports into the intake manifold with gases from the throttle body may be promoted. However, when angle 800 is increased the mixing of the exhaust gases may be decreased.

FIG. 9 shows a side view of intake manifold 300. It will be appreciated that angle 900 defined between the axes of the intake runners and the axis of the throat may be between 80°-110°. This type of alignment increases the compactness of the intake manifold. However, in other embodiments other alignments are possible.

FIG. 10 shows a method 1000 for operation of an intake system included in an internal combustion engine. Method 1000 may be implemented by the systems, components, etc., described herein. However in other embodiments the method may be implemented via other suitable systems and components.

At 1002 the method includes selectively introducing gases into a vacuum port leading to an engine intake manifold. In some examples selectively introducing gases into a vacuum port may include at 1004 actuating one or more valves. It will be appreciated that the vacuum port may be coupled to a crankcase ventilation system, an evaporative emission system, a brake system, and an EGR system. Therefore selectively introducing gases into the vacuum port may include flowing gases from a vapor canister to the vacuum port, flowing air from an engine crankcase to the vacuum port, or flowing air from a brake system to assist the vehicle braking into the vacuum port. The gases may be introduced into the vacuum port during selected operating conditions, as previously discussed.

At 1006 the method includes splitting said gases around a flow disrupting cross-beam in an outlet of the vacuum port to increase gas turbulence. As previously discussed the cross-beam may be positioned perpendicular to the axis of the intake manifold inlet. The cross-beam may be configured to increase the turbulence in the gases to reduce unwanted noises (e.g., resonance) within the intake manifold. The cross-beam may also promote mixing of the gases from the vacuum port with the gases from the throttle body, thereby decreasing combustion variability.

At 1008 the method includes introducing the split gases into the intake manifold. At 1010 the method may further include flowing the gases from the intake manifold into a plurality of intake runners. After 1010 the method ends.

The systems and methods described above enable the reduction of unwanted noises within the intake manifold, thereby improving customer satisfaction. Additionally, the flow disruptor may also promote mixing of gases from a vacuum port with intake air, decreasing combustion variability and improving combustion performance.

It will be appreciated that the configurations and/or approaches described herein are exemplary in nature, and that these specific embodiments or examples are not to be considered in a limiting sense, because numerous variations are possible. The subject matter of the present disclosure includes all novel and nonobvious combinations and subcombinations of the various features, functions, acts, and/or properties disclosed herein, as well as any and all equivalents thereof.

The invention claimed is:

1. An intake system of an engine, comprising:
   an intake manifold;
   a first vacuum port located in said intake manifold and in an air flow path downstream of a throttle body and upstream of a plurality of intake runners, the first vacuum port including a molded flow disruptor including a cross-beam traversing an outlet of the first vacuum port;
   a first vacuum passage coupling the first vacuum port to a first vehicle subsystem; and
   a second vacuum port having an unobstructed opening positioned in said intake manifold downstream of the first vacuum port, the second vacuum port coupled to a second vehicle subsystem via a second vacuum passage.

2. The intake system of claim 1, wherein said first vacuum port is at least one of a brake boost port, a positive crankcase ventilation port, and a fuel vapor purge port.

3. The intake system of claim 1, wherein each intake runner includes a partition.

4. The intake system of claim 1, wherein said flow disruptor includes at least one cross-beam.

5. The intake system of claim 1, wherein an axis of the first vacuum port intersects an axis of a throat of the intake manifold.

6. The intake system of claim 1, wherein said flow disruptor is integrally molded into the first vacuum port.

7. The intake system of claim 1, wherein said cross-beam includes an outer face that is substantially planar.

8. The intake system of claim 1, wherein the ratio between the width of the cross-beam and the radius of the first vacuum passage is between 1 and 0.1.

9. The intake system of claim 1, wherein the cross-beam is oriented at an angle between 45 and 135 degrees with respect to an axis of a throat in the intake manifold.

10. A method for an intake system in an engine for a vehicle, comprising:
    selectively introducing gases into a vacuum port leading to an engine intake manifold, including flowing gases from a vapor canister to the vacuum port;
    splitting said gases around a flow disrupting cross-beam in an outlet of the vacuum port to increase gas turbulence; and
    introducing the split gases into the intake manifold.

11. The method according to claim 10, further comprising flowing gases into a plurality of intake runners from the outlet.

12. An intake system in an internal combustion engine, comprising:
    a partitioned intake manifold to which a plurality of intake runners are coupled;
    a first vacuum port located in said intake manifold and in an air flow path downstream of a throttle body and upstream of said plurality of intake runners, the first vacuum port including an integrally molded flow disruptor including a cross-beam traversing an outlet of the first vacuum port;
    a vacuum passage coupling the first vacuum port to a vehicle subsystem; and
    a second vacuum port having an unobstructed opening positioned in the partitioned intake manifold downstream of the first vacuum port, the second vacuum port coupled to a second vehicle subsystem via a second vacuum passage.

13. The intake system of claim 12, wherein the first vacuum port is at least one of a brake boost port, a positive crankcase ventilation port, and a fuel vapor purge port.

14. The intake system of claim 12, where an axis of the first vacuum port intersects an axis of a throat of the partitioned intake manifold.

15. The intake system of claim 12, wherein the cross-beam has a circular cross-sectional area.

16. The intake system of claim 12, wherein the second vacuum port is positioned at a first angle with respect to the first vacuum port, the second vacuum port is positioned at a second angle with respect to an axis of a throat of the partitioned intake manifold, and the first vacuum port is positioned at a third angle with respect to the axis of the throat.

* * * * *